(12) United States Patent
Shang et al.

(10) Patent No.: US 11,651,007 B2
(45) Date of Patent: May 16, 2023

(54) VISUAL DATA COMPUTING PLATFORM USING A PROGRESSIVE COMPUTATION ENGINE

(71) Applicant: Einblick Analytics, Inc., Cambridge, MA (US)

(72) Inventors: Zeyuan Shang, Cambridge, MA (US); Emanuel Zgraggen, Malden, MA (US); Tim Kraska, Arlington, MA (US); Benedetto Buratti, Providence, RI (US); Philipp Eichman, Melrose, MA (US); Navid Karimeddiny, Boston, MA (US); Charles Meyer, Cambridge, MA (US); Wesley Runnels, Cambridge, MA (US)

(73) Assignee: Einblick Analytics, Inc., Cambridge, MA (US)

( * ) Notice: Subject to any disclaimer, the term of this patent is extended or adjusted under 35 U.S.C. 154(b) by 0 days.

(21) Appl. No.: 17/869,243

(22) Filed: Jul. 20, 2022

(65) Prior Publication Data
US 2023/0023181 A1    Jan. 26, 2023

Related U.S. Application Data

(60) Provisional application No. 63/224,002, filed on Jul. 21, 2021.

(51) Int. Cl.
*G06F 16/26* (2019.01)
*G06F 16/23* (2019.01)
*G06F 16/16* (2019.01)

(52) U.S. Cl.
CPC ............ *G06F 16/26* (2019.01); *G06F 16/168* (2019.01); *G06F 16/2379* (2019.01)

(58) Field of Classification Search
USPC .......................................................... 707/705
See application file for complete search history.

(56) References Cited

U.S. PATENT DOCUMENTS

| 9,495,652 B1 * | 11/2016 | Cook ..................... G06Q 10/00 |
| 2014/0081652 A1 * | 3/2014 | Klindworth ........ G06Q 10/0635 705/2 |

(Continued)

OTHER PUBLICATIONS

Kraska, "Northstar: An Interactive Data Science System," Proceedings of the VLDB Endowment, vol. 11, No. 12, 2018.

(Continued)

*Primary Examiner* — Cam Linh T Nguyen
(74) *Attorney, Agent, or Firm* — David H. Judson

(57) ABSTRACT

The subject matter herein provides a method, apparatus and computer program product that combines, in one intuitive interface, visualization user interfaces (UIs) as used for descriptive analytics, with workflow UIs as used for predictive analytics. These interfaces provide a visual workspace front-end. The workspace is coupled to a back-end that comprises a data processing engine that combines progressive computation, approximate query processing, and sampling, together with a focus on supporting user-defined operations, to drive the front-end efficiently and in real-time. The processing engine achieves rapid responsiveness through progressive sampling, quickly returning an initial answer, typically on a random sample of data, before continuing to refine that answer in the background. In this manner, any operation carried out in the platform immediately provides a visual response, regardless of the underlying complexity of the operation or data size.

22 Claims, 14 Drawing Sheets

(56) References Cited

U.S. PATENT DOCUMENTS

| | | | | |
|---|---|---|---|---|
| 2017/0083290 | A1* | 3/2017 | Bharthulwar | G06F 9/4856 |
| 2018/0089283 | A1* | 3/2018 | Indyk | G06F 16/248 |
| 2018/0210709 | A1* | 7/2018 | Bharthulwar | G06F 8/33 |
| 2018/0247348 | A1* | 8/2018 | Kiziuk | G06Q 30/04 |
| 2018/0293656 | A1* | 10/2018 | Yeh | G06Q 40/06 |

OTHER PUBLICATIONS

Crotty et al., "VIZDOM: Interactive analytics through pen and touch," Proceedings of the VLDB Endowment 8, 12 (2015).

Eichmann, et al., "IDEBench: A benchmark for interactive data exploration," arXiv:1804.02593v1 [cs.DB] Apr. 7, 2018.

Hausenblas, et al., "Apache drill: interactive ad hoc analysis at scale," Big Data 1, 2 (2013).

Melnik et al., "Dremel: interactive analysis of web-scale datasets," Proceedings of the VLDB Endowment 3, 1-2 (2010).

Sethi et al., "Presto: SQL on everything," 2019 IEEE 35th International Conference on Data Engineering (ICDE), IEEE, 2019.

Yang et al., "Druid: A real-time analytical data store, Proceedings of the 2014 ACM SIGMOD International Conference on Management of Data," ACM 2014.

Zaharia, et al., "Discretized streams: Fault-tolerant streaming computation at scale, Proceedings of the twenty-fourth ACM symposium on operating systems principles," ACM 2013.

Peng, et al., "AQP++: connecting approximate query processing with aggregate precomputation for interactive analytics," Proceedings of the 2018 International Conference on Management of Data, ACM 2018.

Hellerstein, et al., "Interactive data analysis: The control project," Computer 32, 8 (1999).

Jermaine, et al., "Scalable approximate query processing with DBO engine," ACM Transactions on Database Systems, (TODS) 33, 4 (2008).

Condie, et al., "MapReduce online," NSDI, vol. 10, 2010.

Zeng, et al., "G-ola: Generalized on-line aggregation for interactive analysis on big data, Proceedings of the 2015 ACM SIGMOD International Conference on Management of Data," ACM 2015.

Jo et al., "SwiftTuna: Responsive and incremental visual exploration of large-scale multidimensional data," 2017 IEEE Pacific Visualization Symposium (PacificVis), IEEE, 2017.

Liu et al., "The effects of interactive latency on exploratory visual analytics," IEEE transactions on visualization and computer graphics, 20, 12 (2014).

Crotty, et al., "An architecture for compiling UDF-centric workflows," Proceedings of the VLDB Endowment, 8, 12 (2015).

Kamat et al., "Distributed and interactive cube exploration," 2014 IEEE 30th International Conference on Data Engineering, IEEE 2014.

Acharya, et al., "The Aqua approximate query answering system," ACM Sigmod Record, vol. 29, ACM 1999.

Agarwal, et al., "BlinkDB: queries with bounded errors and bounded response times on very large data," Proceedings of the 8th ACM European Conference on Computer Systems, ACM 2013.

Acharya, et al., "Congressional samples for approximate answering of group-by queries," ACM Sigmod Record, vol. 29, ACM 2000.

Hellerstein, et al., "Online aggregation," ACM Sigmod Record, vol. 26, ACM 1997.

* cited by examiner

ALGORITHM 1: SAMPLE SPACE RESERVATION

Input: $S_{free}, S_{data}$
1  if $S_{data} < S_{free}$ then
2      return $S_{data}$
3  $s = \min(S_{min}, S_{data})$;
4  while $S_{free} < s$ do
5      Break if the largest sample size is no larger than $S_{min}$;
6      Shrink the largest samples to the second largest samples and update $S_{free}$;
7  if $S_{free} < s$ then
8      return Error("No free space!")
9  return $\min(S_{free}, S_{data})$;

VISUAL DATA COMPUTING PLATFORM USING A PROGRESSIVE COMPUTATION ENGINE

BACKGROUND

Technical Field

This application relates generally to next generation analytics tools for data-driven decision making.

Background of the Related Art

Over the last two decades the analytics space has drastically changed. Data has gone from scarce to superabundant, and the popularity of data analytics as a means of making better decisions has exploded. Taking advantage of data, however, is hard, as it requires technical expertise in data management, visualization, machine learning, and statistics, among other disciplines. This poses a significant challenge to decision makers, who usually have a deep understanding of the domain and problem, but not necessarily the technical skills to analyze all the available data. Despite the abundance of tools trying to make data analytics easier, existing tools still severely restrict domain experts from making data-driven decisions on their own. Surprisingly, fully empowering domain experts to make data-driven decisions requires rethinking not only the interface of analytics tools but also the entire backend. This is rooted in the facts that (1) analytic interfaces are still based on two decades-old concepts, dashboards and workflow engines, and that (2) current backends do not aim to run complex often custom operations at the speed-of-thought.

Current analytics tools can be roughly categorized into two groups: descriptive analytics and predictive analytics tools. Descriptive analytics tools, like Tableau, Qlik, Thoughtspot, and others, help domain experts understand past data and are arguably the foundation of any business. Descriptive analytics concerns historic data, i.e., "What happened"? For example, they are used to examine how sales have developed, to track manufacturing costs, and numerous other factors in the past. Traditionally, descriptive analytics was done through reports, and the tools to create those were cumbersome, requiring extensive knowledge of database query languages, such as SQL. The advent of Business Intelligence (BI) tools made it easier to understand past data. Broadly speaking, this change came over three generations of BI tools. The first generation moved users away from reports toward (interactive) dashboards and easy-to-use visual editors. The second generation lowered the barriers to entry even further by moving the software from on-premises applications, which were hard to install, to the cloud. The still-evolving third generation of BI tools, sometimes referred to as augmented analytics, aims to increase the self-service aspect of descriptive analytics by allowing users to ask "what happened"-type questions using natural language, among other things. Over these three generations, BI tools grew in power and functionality, but their goal largely remained the same: create the best visualization of past data.

The manner in which users interact with BI tools has not changed significantly. In the typical approach, a single user creates a single visualization using various dialogues over a single dataset, then composes several of these visualizations into a dashboard so that others can view it. Before the user creates a visualization, however, data integration and cleaning are usually done with external tools, which sometimes come bundled with the BI tool. Unfortunately, this separation of cleaning and integration often makes it difficult to understand the underlying assumptions behind a visualization.

While understanding what happened is key to any business, it is a backward-looking approach. Often of equal interest is the question, "What might happen?", also known as predictive analytics. Here, machine learning (ML) and forecasting models are dominant. These technologies used to be the exclusive domain of highly trained statisticians or data scientists. More recently, tools like Alteryx, DataRobot, KNIME, and others, seek to make predictive analytics more widely accessible. These tools, sometimes referred to as self-service ML or Data Science platforms, provide visual user interfaces for building models and/or creating entire machine learning pipelines.

The user interfaces of self-service ML/Data Science tools are often quite different from the BI tools, as they aim to create the best possible model for a given scenario. Instead of dialogue-based interfaces, they are usually built on top of visual workflow engines, where individual operations are represented by boxes, which are then connected by the user to form an entire ML pipeline. The advantage of this type of interface is that it makes it easier to understand how the data "flows" from its source and raw format to the final model to eventually create a prediction. This is particularly important for ML, as different ways of cleaning and encoding data can have profound impacts on the final accuracy of the model. The downside of workflow engines, however, is that they do not provide any immediate feedback or interactivity. The user has to press a "play" button after curating the pipeline, which then starts the computation of the composed workflow, and it might take hours until the first result is produced. While some tools try to overcome this issue by providing more immediate feedback for parts of the pipeline through specialized interfaces (e.g., for hyperparameter tuning), they do so at the cost of ensuring that the user still sees and understands the whole process.

While the focus of existing tools is on "What happened?" and "What might happen?", an underlying question that an organization often wants to answer is "What should we do?" There are cases where the right action can be found just by understanding the past (descriptive analytics). In other cases, however, finding the right action might require building a forecasting model (predictive analytics). Other cases may require evaluating several scenarios and considering relevant risk factors. The latter type of analysis may require technical tools, such as what-if analysis or constraint solvers. These tools and techniques—which were originally framed as prescriptive analytics—are not easy to use, and typically they are only be found in highly-specialized verticals.

Moreover, existing analytics platforms and solutions are insufficient for several reasons. In particular, existing data engines exhibit high latency. In particular, traditional analytical database management systems (DBMSs), which are used widely as the backbone for descriptive and predictive tools, often take seconds, or even minutes, when computing results on increasingly large databases. According to studies, if latencies are greater than 500 milliseconds, user engagement with datasets degrades significantly. Moreover, even databases designed to work with large and complex datasets like MonetDB were not necessarily designed to run complex analytics tasks. Some systems, like Spark, can run complex analytics; that said, even starting a single job on Spark can take seconds, and running complex jobs over large data can take minutes to hours, making it impossible to collaborate in real-time on data problems.

Another problem with existing systems is that they are unable to adapt to next generation analytics workflows. Because more data mining and machine learning techniques are being used as part of data-driven decision making, workflows are no longer limited to online analytical processing (OLAP). Instead, modern workflows are becoming much more heterogeneous. For example, many users frequently move between simple data exploration (e.g., using common visualizations like histograms) to performing various other tasks, such as key-driver analysis (a form of automatic statistical testing for significant differences), performing frequent pattern mining, building forecasting models, and performing what-if analysis. These types of complex workflows require a fundamental rethinking of the computation model, in a way that is flexible enough to accommodate for different computation needs.

Finally, decision-making in large and complex organizations is often a group activity oriented around discussion and ideation with multiple stakeholders. In such cases, analytic tools built around pipelines and visualizations alone, rather than enabling collaboration, are insufficient. In general, existing analytics solutions do not provide efficient support for multiple users working at one time. This in turn poses many resource management challenges, including allocating the computation and storage resources across multiple jobs to maximize the overall user experience for all participants.

There remains a need to provide new tools and methods to facilitate data-driven decision making and collaboration, and that enable users to move quickly, seamlessly, and in real-time among different analytics modalities to derive a best outcome.

The subject matter of this disclosure addresses this need.

BRIEF SUMMARY

The subject matter herein provides a method, apparatus and computer program product that combines, in one intuitive interface, visualization user interfaces (UIs) as used for descriptive analytics, with workflow UIs as used for predictive analytics. These interfaces provide a visual workspace front-end, which workspace is coupled to a back-end that comprises a data processing engine (sometimes referred to herein as a "data engine" or "computation engine") that combines progressive computation, approximate query processing, and sampling, together with a focus on supporting user-defined operations, to drive the front-end efficiently and in real-time.

According to one aspect, a method for performing analytics on a dataset comprising a plurality of data sources begins by providing the visual workspace and its associated processing engine. The workspace supports, concurrently, one or multiple sets of data configured as dataframes, together with a set of operators that process data, wherein each dataframe is a structured or semi-structured piece of data generated from a data source or an operator, and wherein an operator is a block of computation. The processing engine is supported as an "accelerator" between the visual workspace and the plurality of data sources. In operation, and in response to a change to one of: a dataframe, and an operator, the processing engine automatically updates a state of the visual workspace using a computation over data stored in one or more of the plurality of data sources. In particular, the computation returns a progressive stream of responses that includes a first response that is an approximation, one or more incremental updates, and an optional final response. A response is a data stream, and the first response is returned based on an initial subset or sample of the dataset. As the computation iterates by scaling over the dataset, the results are progressively refined and returned as the one or more incremental updates and the final response.

The processing engine achieves rapid responsiveness through progressive sampling, quickly returning an initial answer, typically on a random sample of data, before continuing to refine that answer in the background. In this manner, any operation carried out in the platform immediately provides a visual response, regardless of the underlying complexity of the operation or data size.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
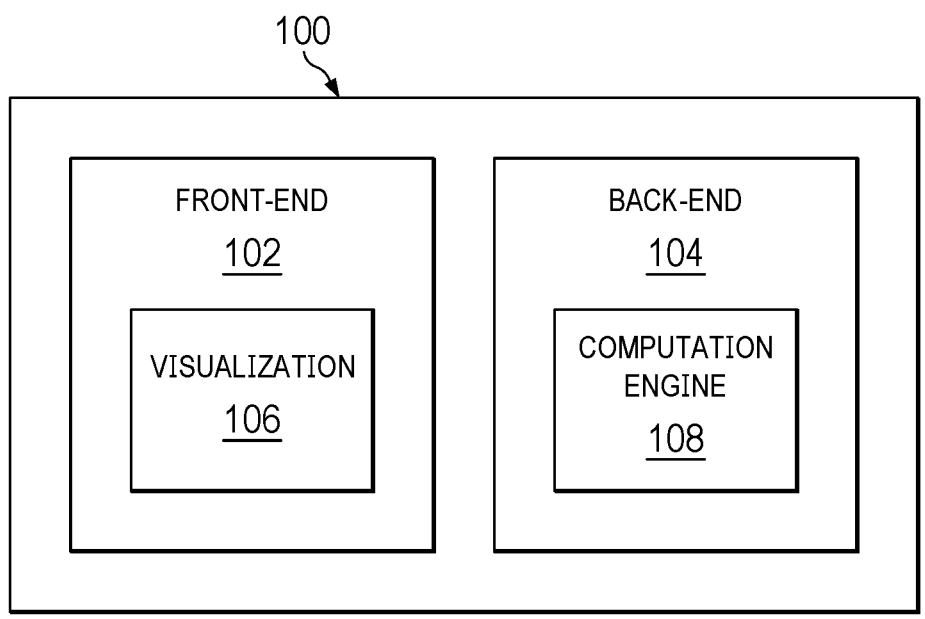
FIG. 1 depicts the computing platform of this disclosure.

Referring now to FIG. 1, the computing platform 100 of this disclosure comprises a front-end 102, which is coupled to a back-end 104. As noted above, the front-end 102 comprises a visualization workspace 106, and the back-end comprises a data processing (computation) engine 108. As will be described below, the front-end visualization interface is an unbounded canvas where operators are laid out freely, new space is always available, and navigation (e.g., pan and zoom) is enabled. The back-end processing engine combines progressive computation, approximate query processing, and sampling such that, for any operation carried out, the platform immediately provides a visual response on the workspace, regardless of the underlying complexity of the operation or data size.

In one operating environment, the computing platform 100 is managed and operated "as-a-service," e.g., by a cloud-based service provider entity. This is not a requirement, however, as the platform may be supported on-premises, or in a private-public hybrid cloud. In general, the computing platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications (e.g., the visualization workspace, and the computation engine) implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid. Although typically the platform is network-accessible, e.g., via the publicly-routed Internet, the computing system may be implemented in a standalone or on-premises manner. In addition, one or more of the identified components may interoperate with some other enterprise computing system or application.

One or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the machine learning techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Figure 2:
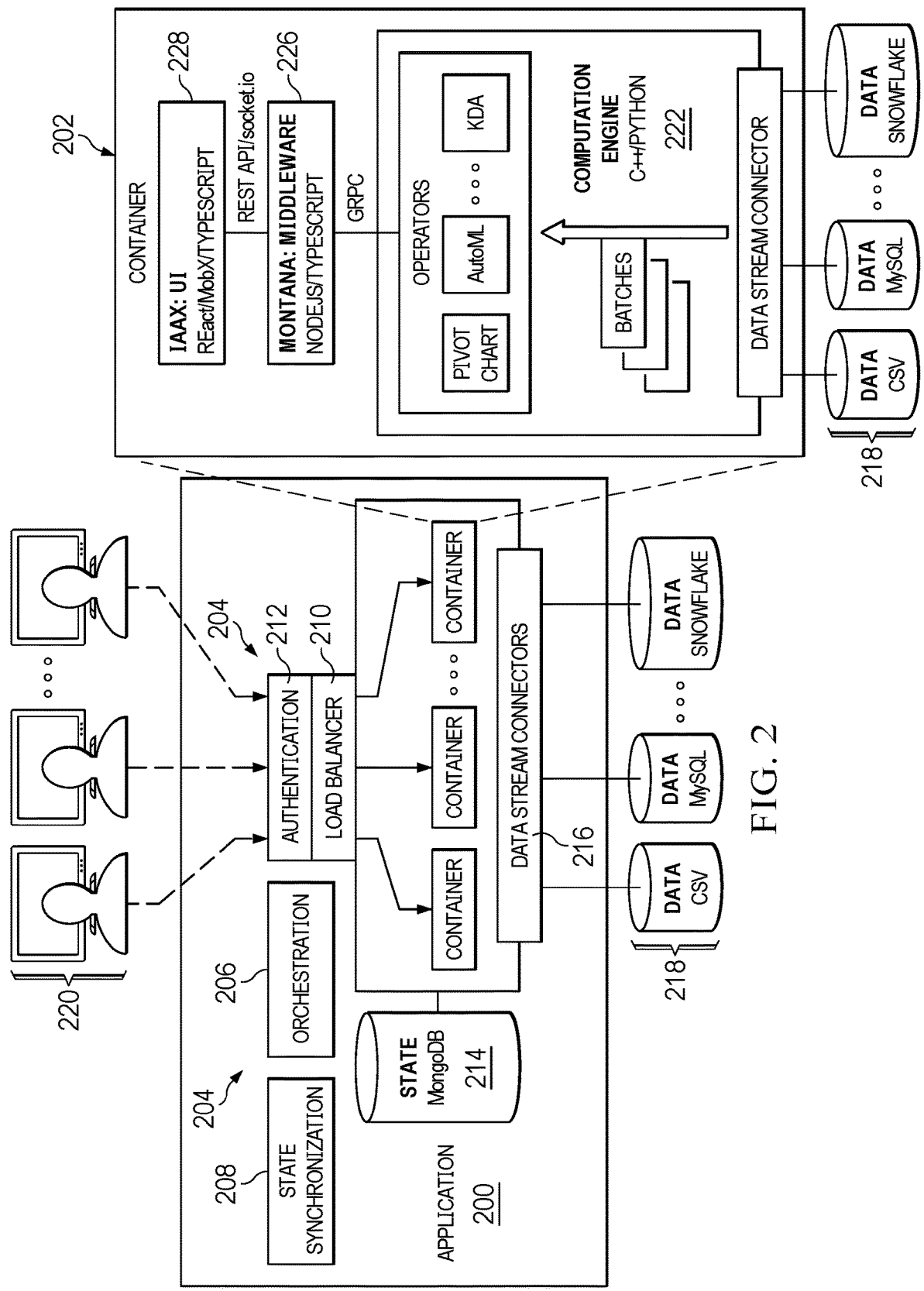
FIG. 2 depicts the computing platform of FIG. 1 in additional detail in one exemplary embodiment.

Referring now to FIG. 2, an exemplary embodiment of the platform is composed of two (2) main logical components: an application 200, and a container 202. The application 200 is composed of several sub-components such as application infrastructure components 204, container orchestration 206, application state synchronization logic 208, load balancing 210, secure user authentication system 212, a database 214, and one or more data stream connectors 216 that are coupled to various data sources 218. One or more users 220 perform analytics on a dataset comprising the plurality of data sources 218. Users 220 access the application over a network to collaborate with one another, typically from different locations. Although not intended to be limited, the containers 202 run in a Kubernetes cluster, and each user request gets authenticated by the secure user authentication system 212. When a particular user 220 connects to the application 200, the user is assigned by the load balancer 210 to a container. Typically, the containers are replicas that are kept in synchronization by data in the database 214 (e.g., MongoDB). The database is updated every time a user makes a modification to his or her workspace, and it propagates the new information to all the replicas, thereby enabling real-time collaboration among the users that are remotely-located.

A container 202, one of which is shown in exploded view, is dedicated to executing the users' workloads. As mentioned above, and as described in detail below, the container leverages the computation engine 222 to perform progressive computation to return results with interactive speeds. In the platform, workloads are executed in the containers, typically in association with a set of objects that comprise a reactive and interactive visual language for working with data. As depicted, the set of objects include one or more operators 224 and, as described below, dataframes and links (not shown). An operator 224 is a block of computation that takes in zero to many dataframes, each of which can be filtered using so-called links. A dataframe is a structured piece of data (e.g., a spreadsheet or a table in a database); dataframes either are generated by reading from a data-source 218 (e.g., CSV file, SQL database), or by some operator. In particular, the computation engine 222 works over data streams and enables interactive speed. Once a user 220 is assigned to a container 202, every job is sent to the back-end, which starts pulling data from a specified data-source 218. Where possible, the platform pushes down sampling predicates to the underlying datasource; otherwise, it will scan through the data and compute a reservoir sample over the datasource. Every operator works over data streams, and the users receive updated versions of the workload outputs every time the execution of an operator over a batch is completed. Once these new versions of the workload result are computed, they are immediately sent to a middleware layer 226 that is responsible for storing application/workspace data, enabling collaboration to synchronize workspace across users (as identified in the database 214) and to send (over a REST-based API and/or websockets) the job results to the front-end code 228.

Process 228 typically is javascript code that runs in the user's browser, and it renders the results generated by the back-end.

Because workspaces state and computation are de-coupled, concurrent users 220 are able to run jobs in the same workspace executing on different containers, guaranteeing synchronization and parallelism at the same time.

Speed and responsiveness are both fundamental to creating a satisfactory user experience, and they are prerequisites to live collaboration on data problems. The computation engine 222 provides this support across every part of the analytics process, from descriptive analytics through to predictive and prescriptive analytics. Progressive computation ensures that a first approximate answer on data is returned immediately (e.g., in less than one second), with the engine then iterating and improving on the first results by automatically scaling over the whole dataset. This facilitates effective real-time collaboration among the concurrent users, as depicted in FIG. 3.

Figure 3:
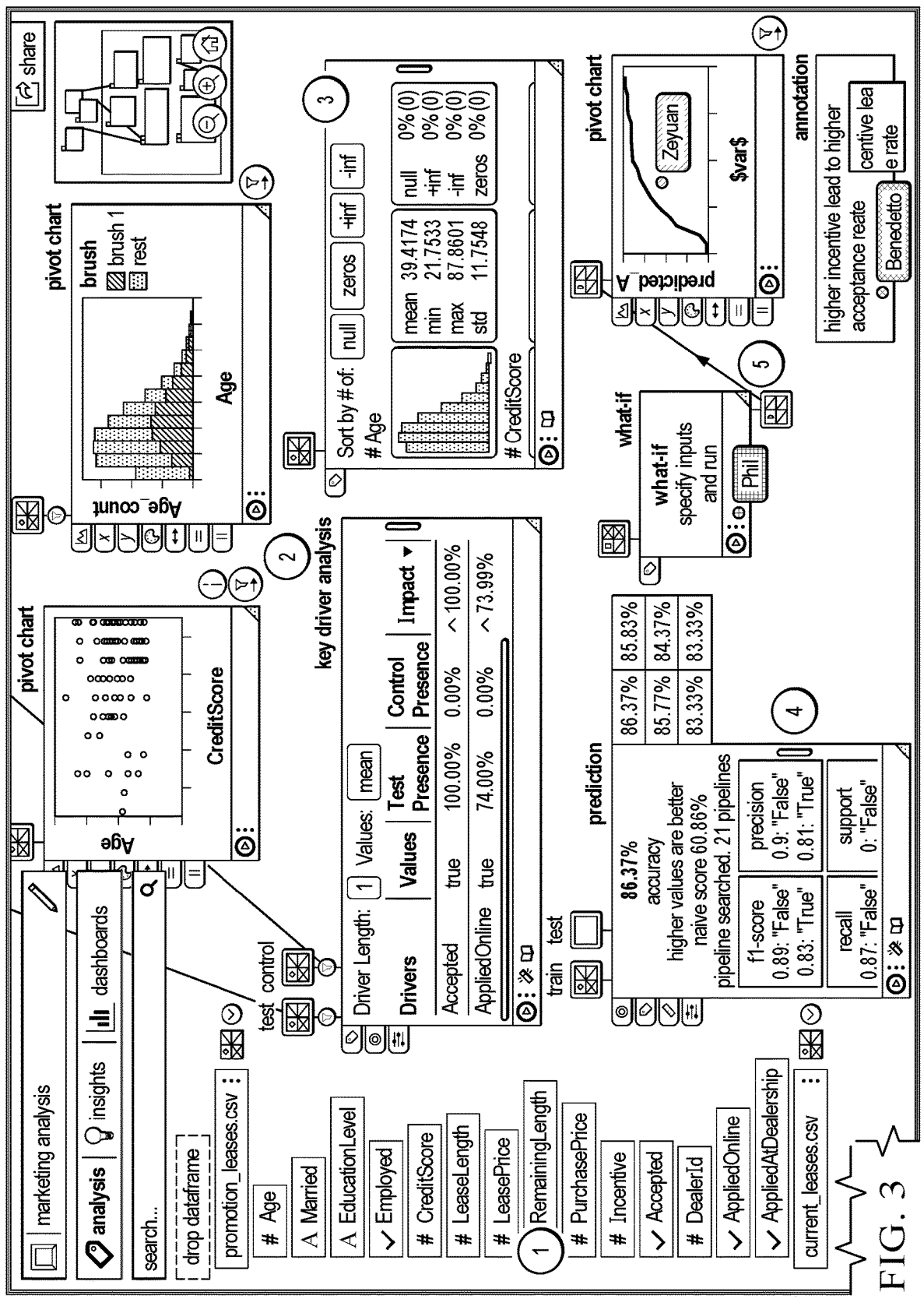
FIG. 3 depicts multiple users collaborating on analyzing marketing campaign data in a workspace performing various steps: (1) importing data from different sources, (2) descriptive analytics through visualizations and statistical methods, (3) profiling of a dataset, (4) automated ML prediction for marketing outcomes, (5) what-if analysis based on ML pipeline of various scenarios.

For example, FIG. 3 depicts multiple users collaborating on analyzing marketing campaign data in a shared workspace and performing various steps: (1) importing data from different sources, (2) descriptive analytics through visualizations and statistical methods, (3) profiling of a dataset, (4) automated ML prediction for marketing outcomes, and (5) what-if analysis based on ML pipeline of various scenarios. Further details of these interactions and visualizations are now provided.

Architecture Front-End

The following section provides additional details regarding the architecture front-end.

As noted above, the visualization UI herein comprises a set of computation and display objects that comprise a reactive and interactive visual language for working with data. As previously described, a dataframe is a structured piece of data generated by reading from a datasource, or by some operator. An operator is a block of computation that takes in zero to many dataframes, each of which can be filtered using so-called links. An operator's computation is configured using parameters. Typically, operators produce a visual that is representative of their computation, e.g., a table, a chart, or the like. Operators produce three (3) types of output: dataframes (zero to many), a filter output, or new operators. An example of an operator that outputs a new operator is one that trains a machine learning algorithm that can then run a new over other dataframes. Links are of two (2) types: dataframe links, and filter links. Dataframe links define how data flows from one operator to another, and filter links generate filter predicates that are applied to dataframes. All of the elements observe changes made to them and react to changes accordingly. For example, an operator observes if any of its parameters has been changed by a user; if so, the operator reacts to such change by re-running its computation if necessary. Similarly, an operator will re-run if one of its input dataframes has been changed. The reactive nature of the system allows for highly interactive workflows where user changes are propagated through complex workflows.

Figure 4:
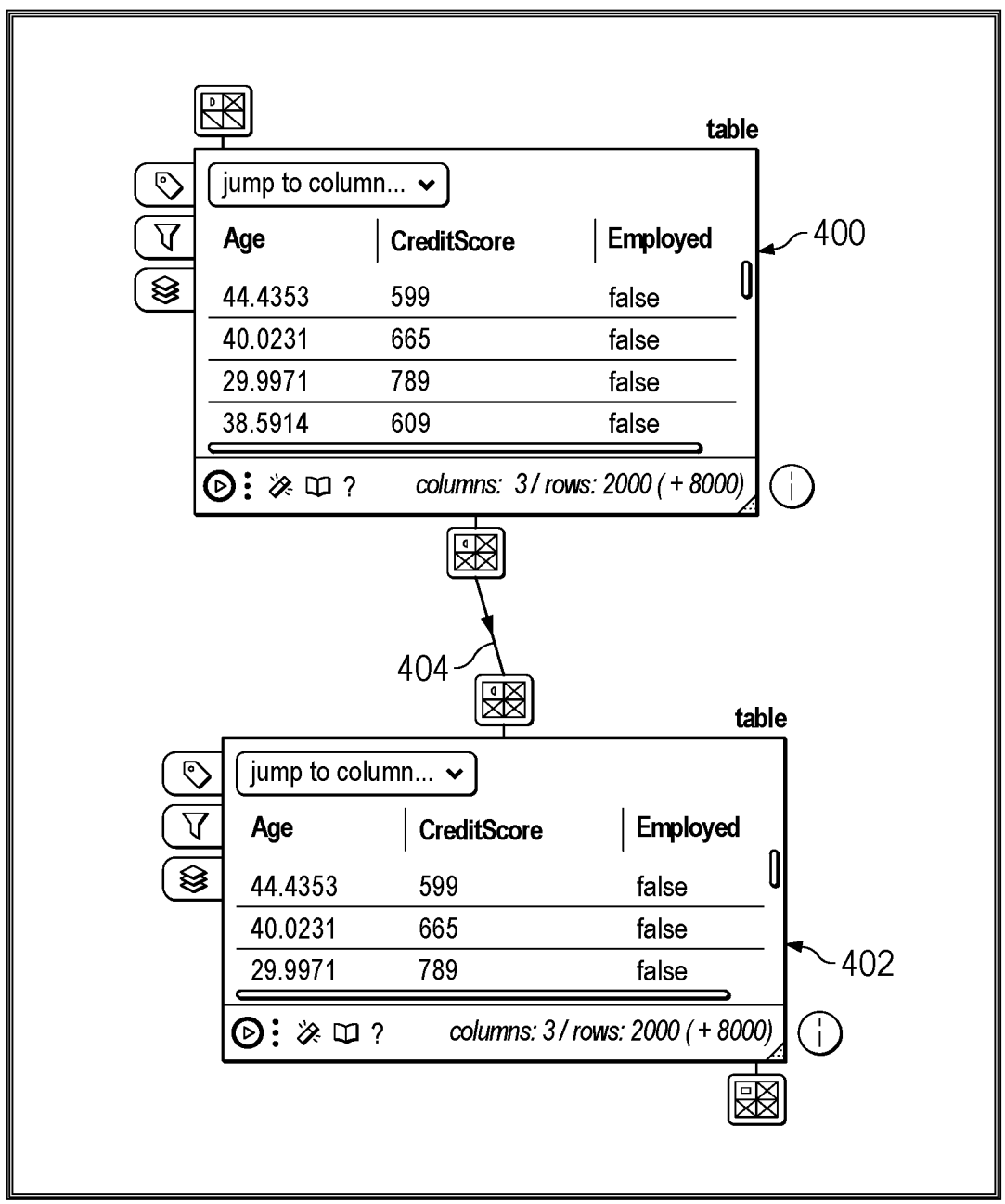
FIG. 4 depicts an example of a dataframe link between to table operators.
Figure 5:
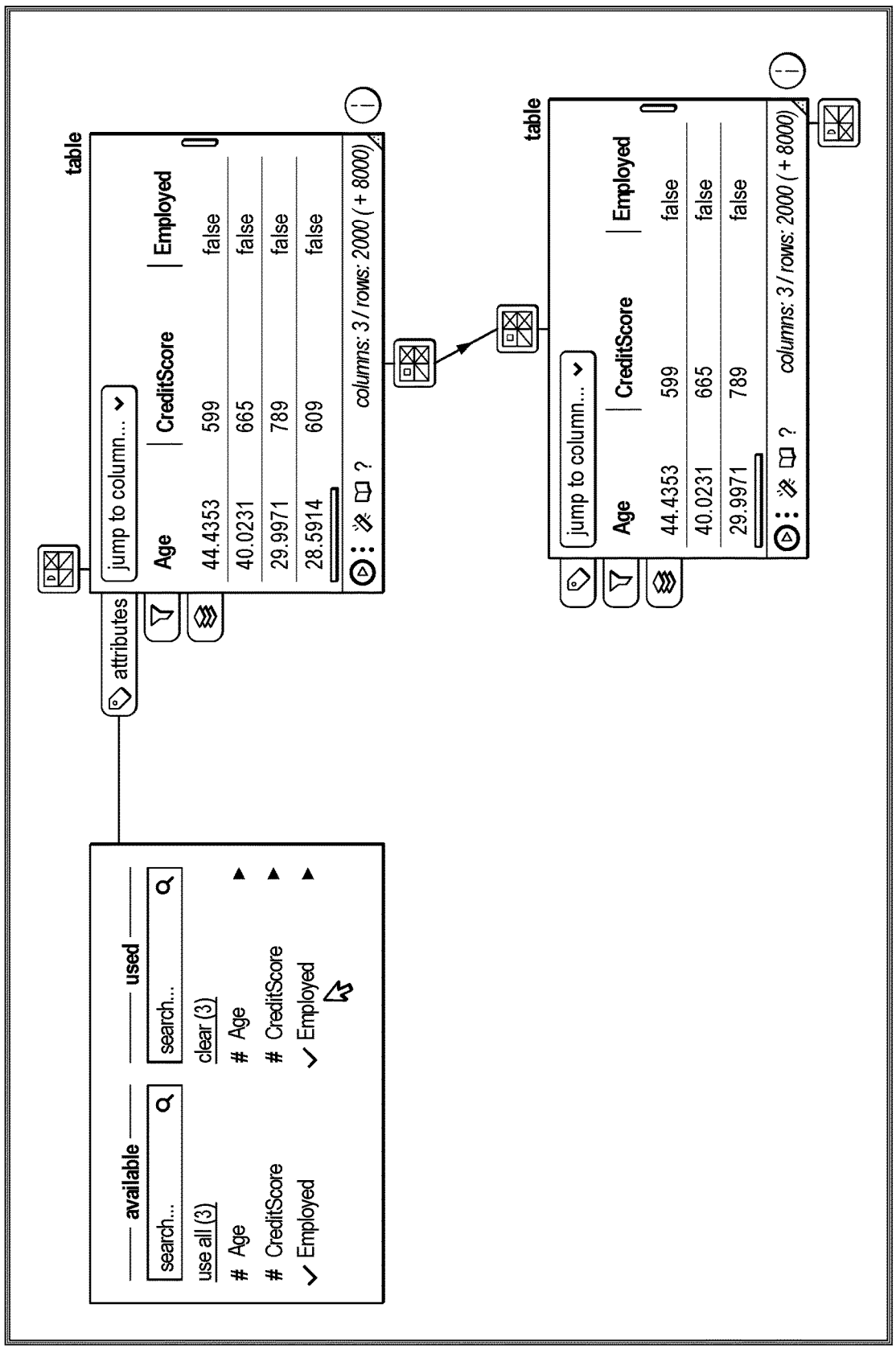
FIG. 5 depicts a user initiating a change in one of the table operators.
Figure 6:
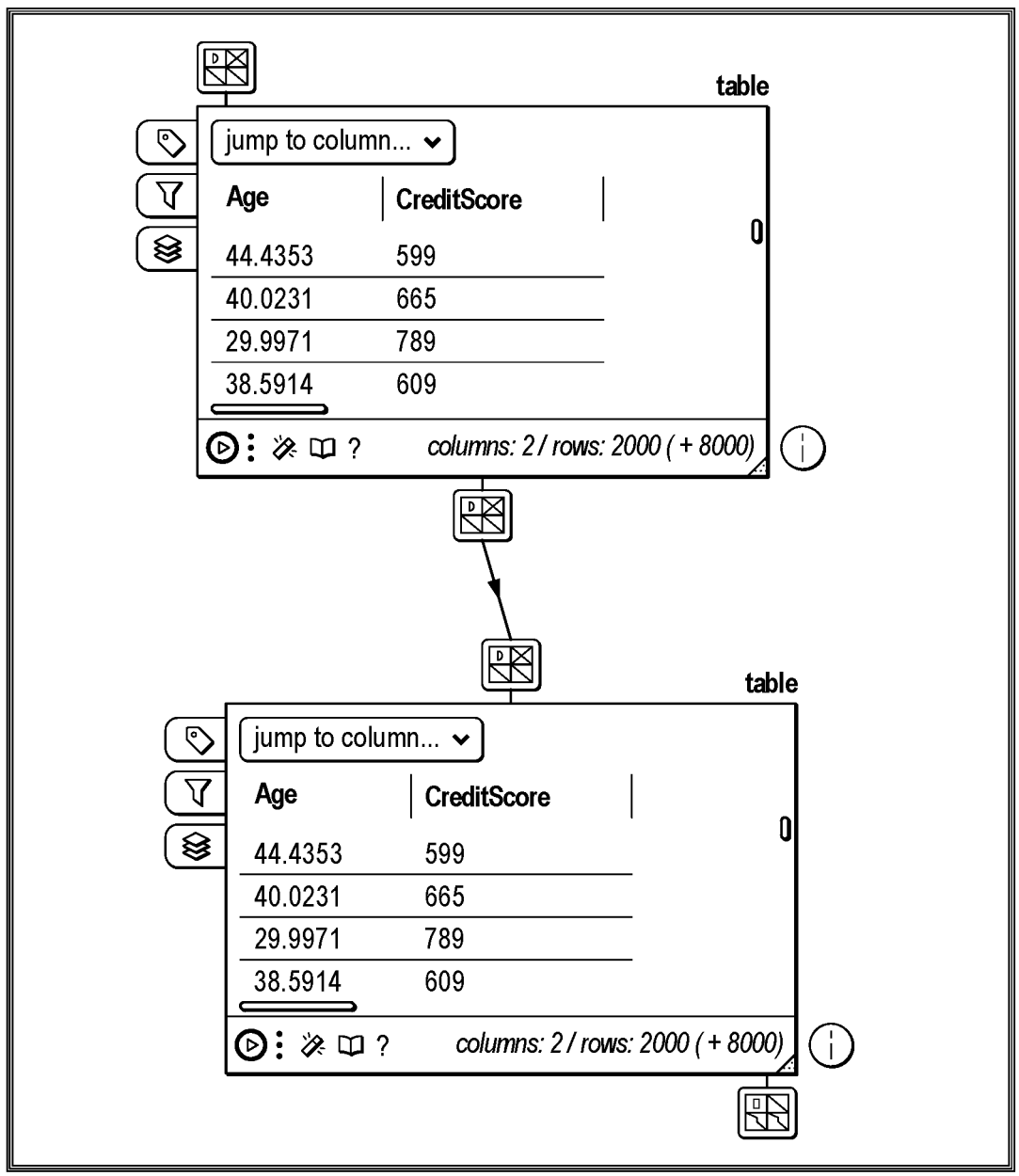
FIG. 6 depicts the result of executing the change operation.

FIG. 4 depicts a simple example that illustrates how dataframe links work. In this example, two table operators are connected by a dataframe link. Thus, and as depicted, the first table 400 is connected to second table 402 by a dataframe link 404. The link connects the output of the table 400 with the input of the table 404. Assume now (and as depicted in FIG. 5) that the user decides to remove one of the columns from the first table operator (changing a parameter to the table operator). The output dataframe generated by the top table operator now only consists of the remaining two attributes (in this example, Age and CreditScore). The bottom table operator automatically reacts to this change; in response, the bottom table operator changes the visual output (the data shown in the operator) as well as its output dataframe. The result of this operation is depicted in FIG. 6.

Although not required, preferably the system color-codes dataframes. This color coding provides a unique identifier that encodes a particular dataframe and allows users to track if dataframes are distinct from one another. Continuing with the above example, the output dataframe of the top operator changes its color code once the user removes a column because it is then a different dataframe that is output (i.e., initially a dataframe with three columns, whereas after the change it is a dataframe with two columns).

Figure 7:
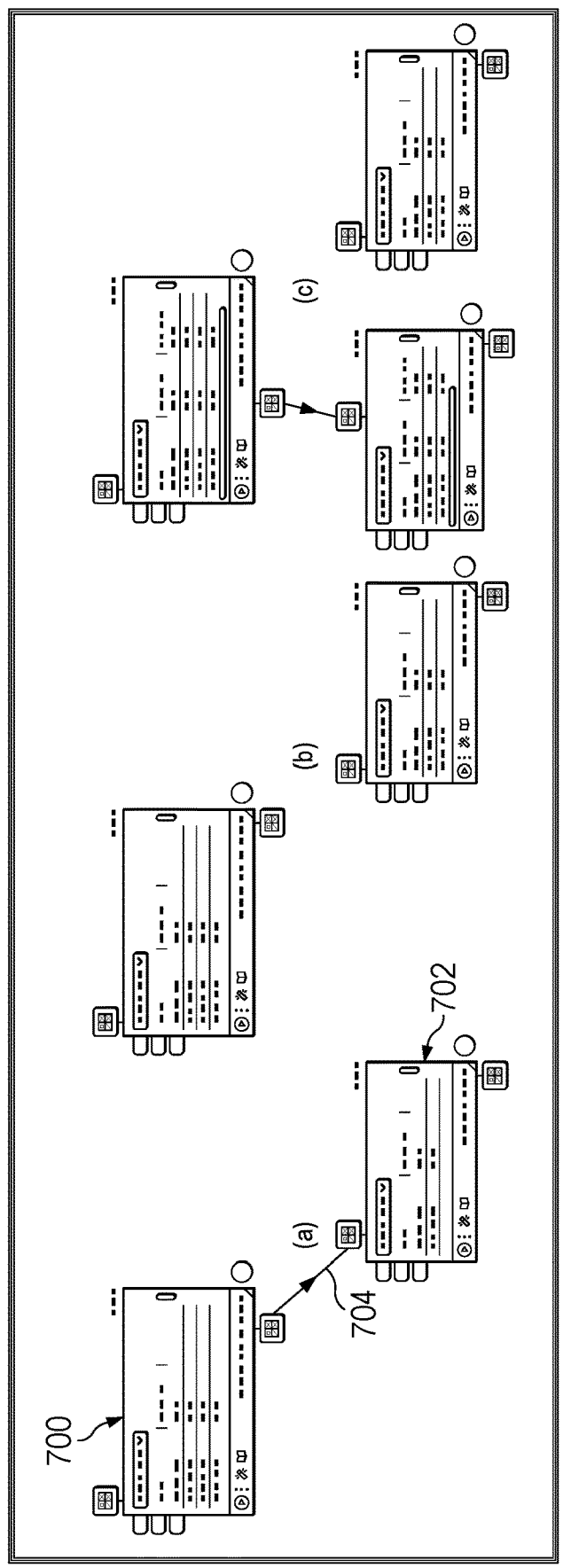
FIG. 7 depicts a user operation that breaks a dataframe link.

By breaking dataframe links a user can generate different versions of a dataframe output, as depicted in FIG. 7. In this example, table operators 700 and 702 are connected by the dataframe link 704, as shown in (a). At (b), the dataframe link 704 is broken, but the second table operator is kept. By manipulating the columns in the top table operator, a new dataframe output is generated as shown at (c), although the original dataframe output is also still present and available for use.

Figure 8:
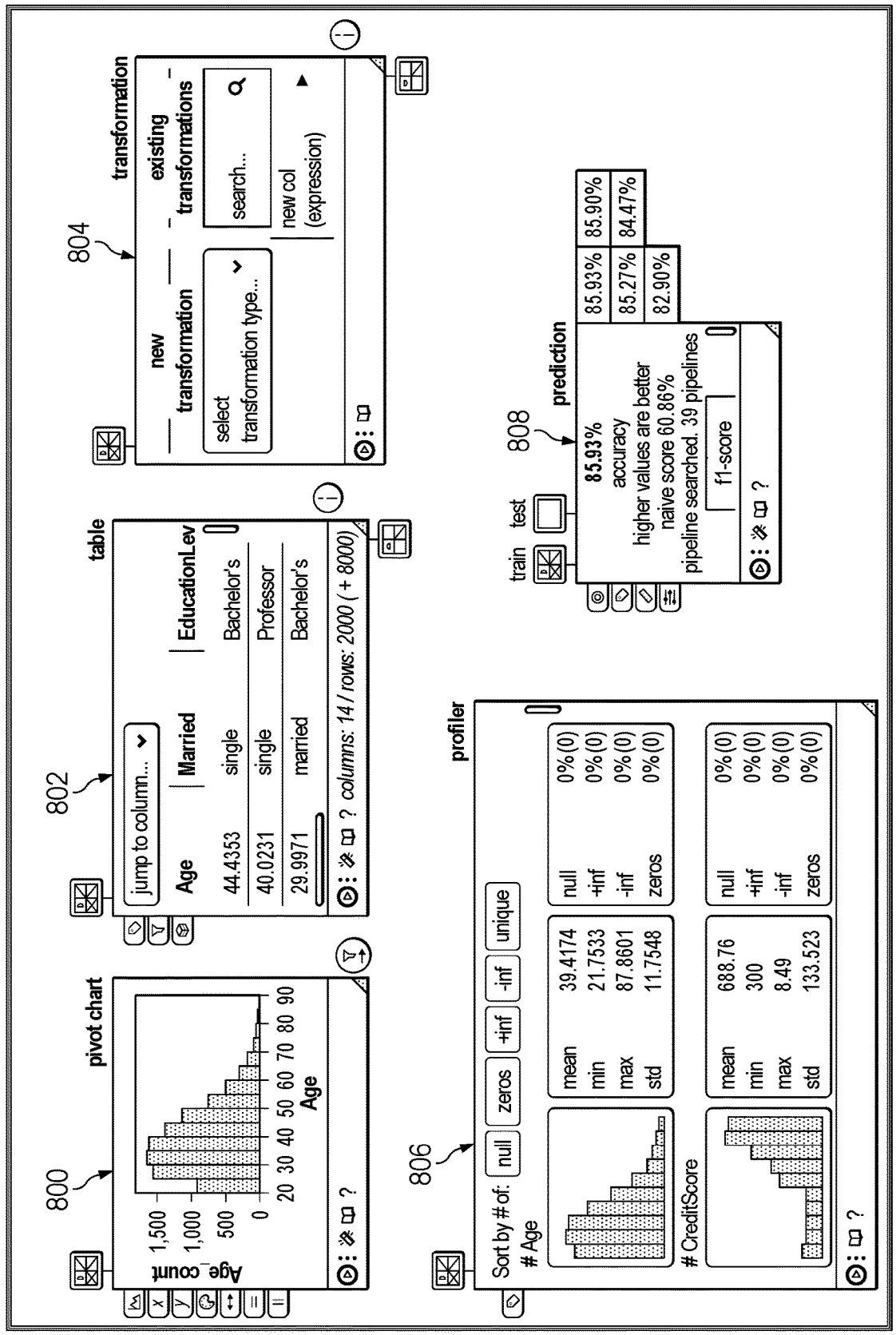
FIG. 8 depicts various representative operators.

The concept of operators provides significant flexibility. In particular, preferably the platform supports many different preconfigured types, and that also allows for operator plugins. Such plugins preferably are written using standard languages such as Python, R and Vega, and are then automatically embedded into the same visual language. FIG. 8 depicts various examples of operators, namely, a pivot chart 800 for visualizations, a table 802, a transformation 804 (e.g., for formulas, and data preparation and cleaning), a profiler 806 for summary of a dataframe, and a prediction 808 for automated machine learning. These are just representative operator examples.

Figure 9:
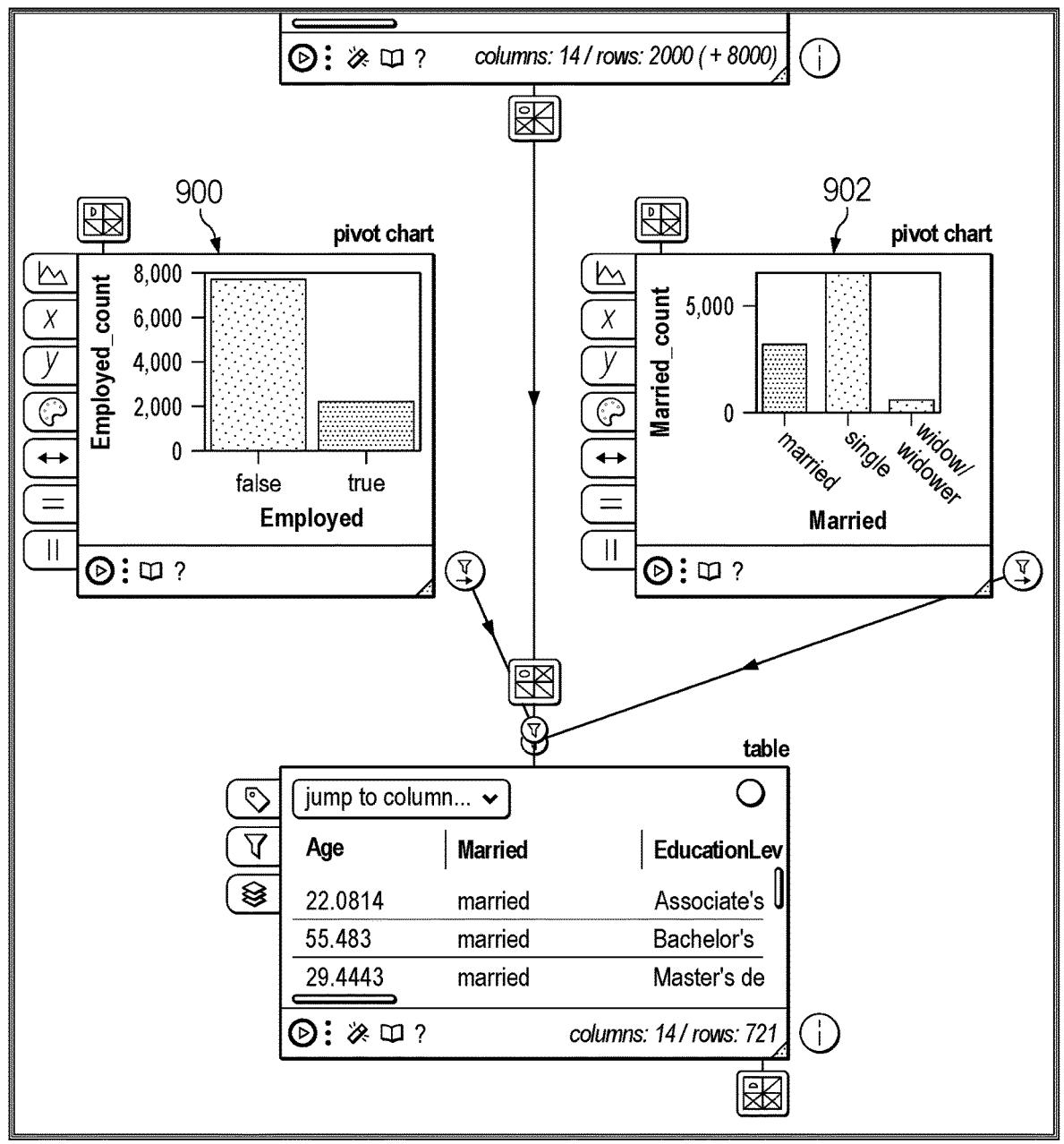
FIG. 9 depicts how filter links work.

As noted above, filter links are applied to dataframes, e.g., to filter the rows of a dataframe down to a specific subset. In the example depicted in FIG. 9, two histograms 900 and 902 are used to generate filters, one that selects customers that are employed, and one that selects customers who are married. These two filters are then ANDed together to filter the input dataframe of the table operator. The Boolean operator is configurable (e.g., AND, OR, NOT, etc.). Filter links thus flow predicates, whereas dataframe links flow dataframes to an operator. Thus, rather than outputting a new dataframe defining the structure of, e.g., columns, a filter link outputs a filter expression that can then be applied to a dataframe (e.g., "Employed=true").

Figure 10:
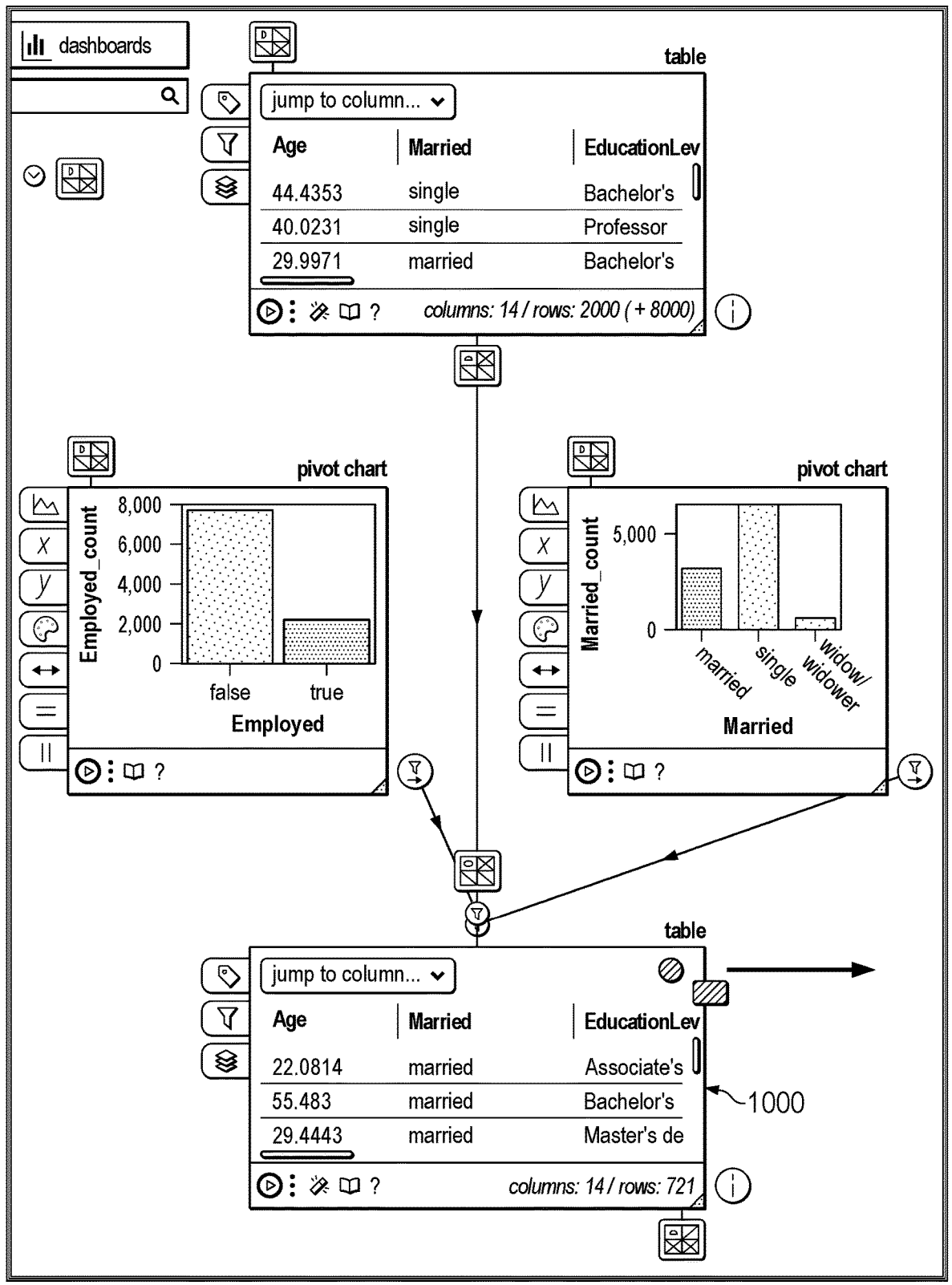
FIG. 10 depicts fine-grained manipulation of an example workspace.

To enable real-time collaboration (or a multi-player mode), the state of a workspace, i.e., the layout of the visual language on an unbounded canvas, can be manipulated at a fine-grained level. This is depicted in FIG. 10. In this example, assume a user is moving an operator 1000 to the right as depicted by the arrow. Instead of sending a total copy of this new workspace state to all connected users so that they can replicate this updated layout, preferably the system only broadcasts small patches of updates. In the example, the update patch is just "workspace: xyz, operator: abc, xPosition: +10px," addressing which workspace and which operator was manipulated and what the change was. The patch maps how to go from one version or state of a workspace to another. Additionally, the system uses these patches to fully re-create the entire history of a workspace across edits from one or more users. Given a series of patches, they can then be re-played (applying them in order) to generate a replay depicting a lifecycle o history of a workspace.

The above examples depicting the front-end visual language are not intended to be limiting.

Architecture Back-End

Figure 11:
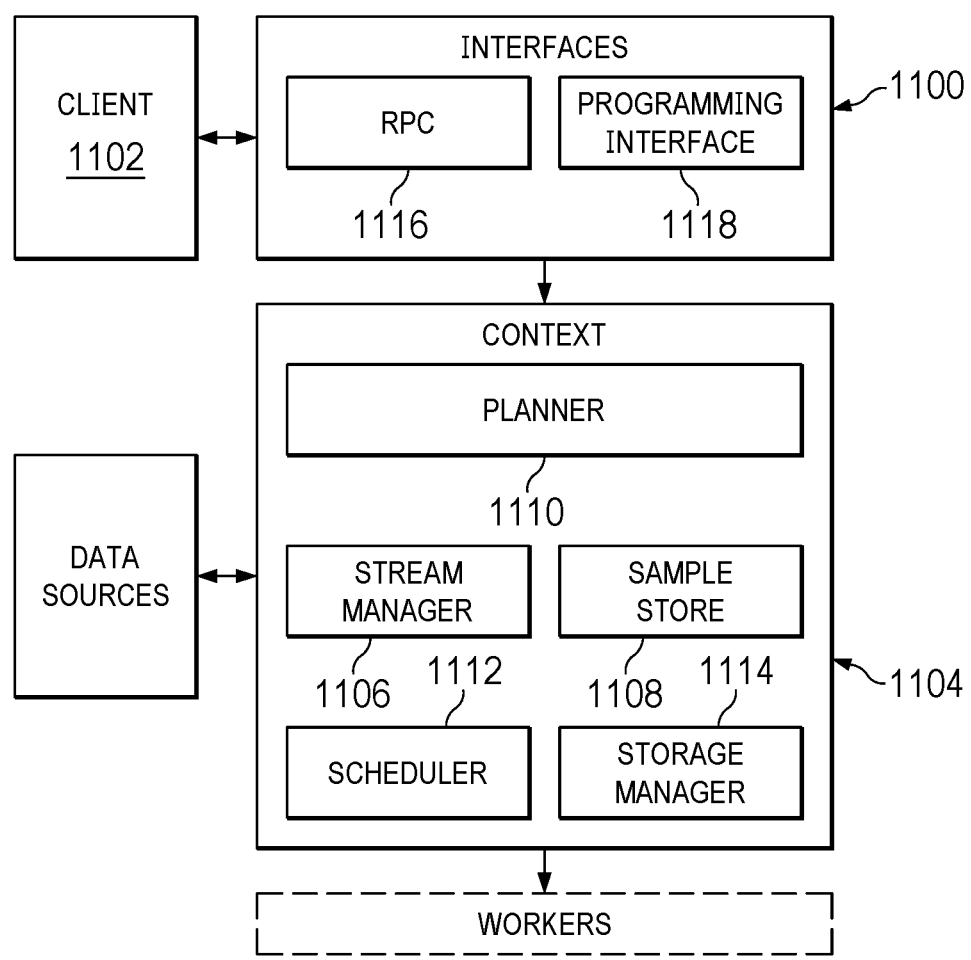
FIG. 11 is a high-level representation of the back-end platform architecture.

The following section describes a detailed design for the back-end architecture, which is depicted in FIG. 11. The back-end comprises an interface 1100 for enabling clients 1102 to submit jobs and receive responses, a context 1104 for generating and scheduling execution plans and managing streams, samples and storage, and a set of one or more workers 1104 for executing the workloads. The context 1104 serves as the infrastructure for the back-end. It includes several components. In particular, a stream manager 1106 keeps track of the data streams such that the operators can communicate with one another. A sample store 1108 manages data samples, e.g., which data source a sample is built from, such that if another job reads from the same data source, built samples can be reused. A planner 1110 optimizes jobs and generates execution plans. A scheduler 1112 is in charge of scheduling jobs to the workers 1104. A storage manager 1114 is responsible for allocation and monitoring of memory and disk, and it manages a cache for intermediate results. Each of these components typically is implemented as computer software (programs, processes, execution threads, etc. and associated data structures) held in memory and/or on disk and execute in one or more hardware processors.

Preferably, jobs to the back-end system are configured as Directed Acyclic Graphs (DAGs) of datasources and steps, where each step specifies its operator (e.g., group, filter, etc.) and its inputs (e.g., from a datasource or from a step). Such queries jobs are submitted from the front-end through the Remote Procedure Calls (RPC) interface 1116. For debugging and development purposes, a programming API 1118 also is provided.

Figure 12:
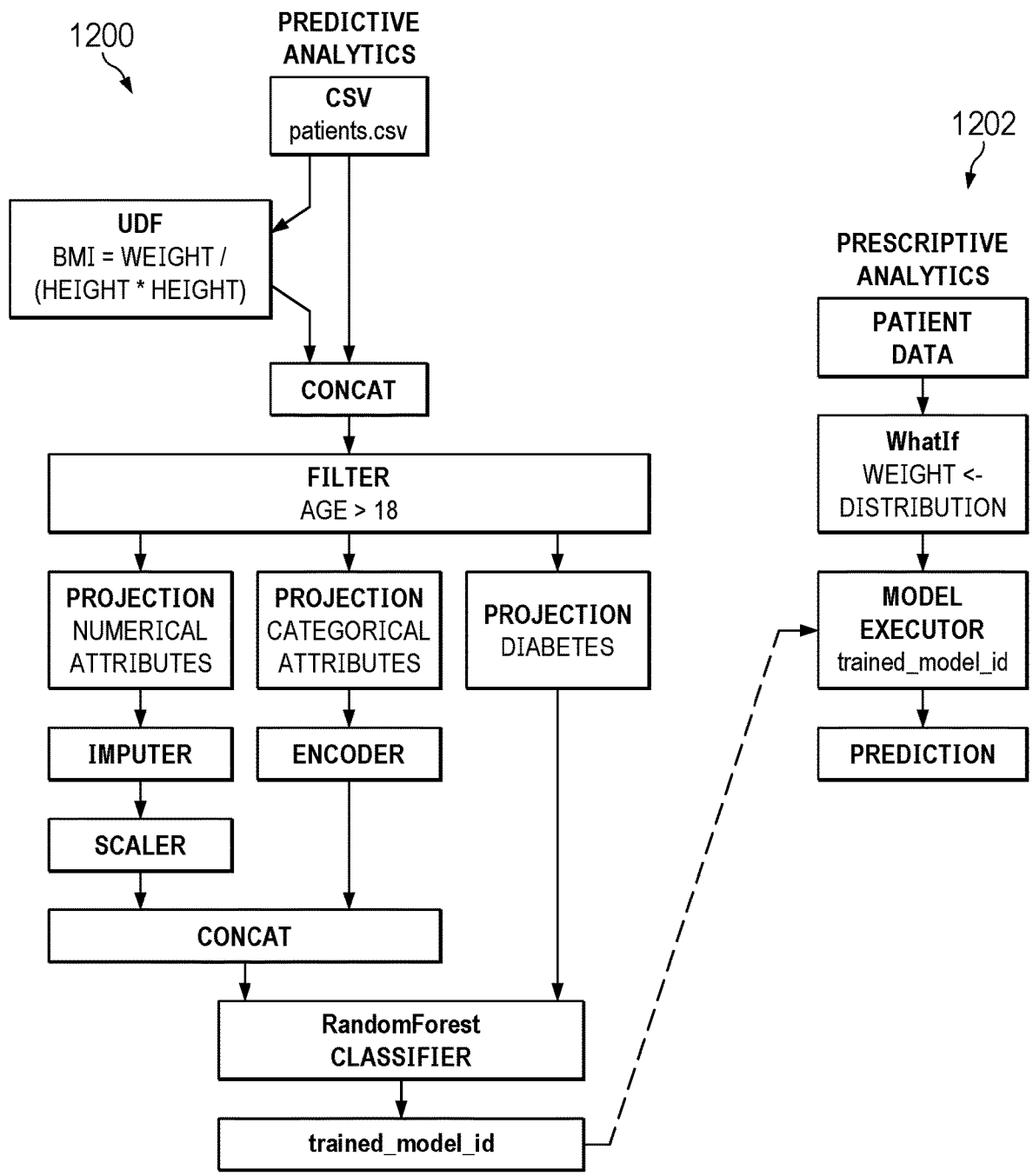
FIG. 12 depicts several examples of graph-structured jobs to the back-end system.

FIG. 12 depicts several example jobs. DAG 1200 (on the left) is a job for training a classifier predicting diabetes with complicated feature engineering. This is an example of predictive analytics. DAG 1202 (on the right) shows an example of prescriptive analytics and, in particular, where a where a "what if" operator is used to understand how BMI affects predictions. These are just representative examples and are not intended to be limiting. As will be described below, and for optimization purposes, a given job (or job plan) may be rewritten to utilize a data store's internal processing capabilities.

As noted above, the computation engine uses the notion of data stream or dataflow for progressive computation, wherein all operators in the system consume and produce a sequence of data. In this approach, the system as a whole sends a stream of responses back to the users, and the users get the initial results quickly and thereafter receive incremental updates. A data stream can have multiple versions. Each version is a complete result, and a later version usually means better quality. In this manner, better progressiveness is achieved in two dimensions: (1) the with-in-version progress; (2) the across-version progress. By implementing this multi-version semantic, the back-end achieves a more fine-grained execution and response delivery mechanism to improve the progressiveness, without affecting the flexibility nor complicating the implementation. As used herein, stream and data stream are used interchangeably.

In the approach herein, preferably each version of a data stream is a sequence of Record Batch, which is a collection of equal-length Column Batches. Each column batch is an array of consecutive values for a single column. Without intending to be limiting, data layout may be based on Apache Arrow, which is a language-agnostic columnar memory format for flat and hierarchical data and that is organized for efficient analytic operations on modern hardware like CPUs and GPUs. Both record and column batch are immutable, i.e., new objects are created when modifying them. As used herein, batch and record batch are used interchangeably.

A data stream interface exposes the following statuses and supports both blocking and non-blocking calls to retrieve the next Record Batch or the next version of the stream: HasNext, there are one or more record batches ready and Next can be used to fetch the next record batch; Finished, the data stream has finished and there will be no new versions; Deprecated, the current version has been deprecated and NextVersion can be used to switch to the next version; Stopped, the producer has stopped, thus the stream has been stopped and there will be no new batches; Failed, the producer has failed, thus the stream is failed and there will be no new batches; and Blocking, the status is undetermined, and this is used by the non-blocking call of Status.

A data sample is a data stream with extra metadata information, e.g., sample size, data source information; therefore, a data stream can be reused for jobs reading the same data source. The sample store 1108 in FIG. 11 manages all data samples, including supporting querying samples, keeping tracking of sample memory/disk usage and evicting expired samples. Preferably, each sample has a time-to-live (TTL), and it is removed from the store once its TTL hits zero to keep its freshness. Users can also forcefully refresh a data sample for latest updates.

Preferably, a publish-subscribe pattern is adopted from streams, i.e., a producer (e.g., an operator) publishes a data stream and writes batches to it, and one or more consumers subscribe to this stream and read batches out of it. By default, the published data are not persistent, i.e., they are sent to the active subscribers when being published and the subscribers can only get data published after the subscription. Data streams can be marked explicitly as persistent such that the late subscribers can read the full history of published data, which is useful for reusing and caching. For example, when a sample is created for an expensive data source (e.g., executing a complicated job with many joins in a database), the data stream of this sample can be persisted such that jobs reading the same data source reuse this sample to avoid reading the data source again. Preferably, the persistent data streams are serialized to the disk and deserialized when needed.

The flexibility of the progressive data stream semantic as described above can be seen in an example use case, such as a histogram. Assume it is desired to read from a large CSV file and compute an average of a column. Using the progressive computational approach herein, a first response is generated as follows. In particular, and as soon as the first record batch is read out of the file, it is immediately published such that an aggregation operator can work on this batch and return the first response as fast as possible. Following record batches are handled in a like manner, and therefore users can get progressive updates. Thereafter, sampling is used, and the multi-version semantic allows adoption of a complicated sampling strategy such as the following. While reading a file, take the first K rows and publish it as the first version, and at the same time maintain a reservoir sample and publish it periodically as newer versions. To provide a concrete example, whenever every 10% of the full data has been read, publish the current reservoir sample as a newer version. Subscribers then switch to the newer version once they find out the status has been updated to Deprecated. This hybrid sampling strategy provides a fast first response, while also providing better-quality responses (because they are built from the reservoir samples built over larger data) over time. While providing the results computed over the samples, another job is then launched over the full data (which is also running progressively over batches), and this ground truth result can be the final response in case that users want an fully-accurate result. In this manner, namely, by combining the multi-version progressive data stream semantic and sampling techniques, the computation engine provides better progressiveness while not sacrificing accuracy. A preferred embodiment of the actual sampling strategy is described in more detail below.

The following section provides additional details regarding the operator, which is the basic execution unit of the computation engine. Preferably, two types of operators are supported: a User Defined Function (UDF), and a User Defined Aggregation (UDA). A basic management unit is referred to herein as a job. As will be described, a preferred "hybrid" execution scheme achieves a good trade-off between performance and flexibility.

In general, the back-end executes a job by creating several execution units based on the job, and these execution units communicate with each other through data streams, i.e., to read the outputs of an execution unit, another execution unit can subscribe to its output data stream. As noted, these execution units are the operators. Because data arrives as a sequence, preferably all operators typically run in the same manner, i.e., an operator implements a processing function taking record batches as inputs and producing record batches as outputs. For example, for the filter operator, this function takes in a record batch and produces a record batch with rows selected by the filter. Another example is the horizontal concatenation operator; its function takes into multiple record batches and concatenates them horizontally (i.e., merging all columns) as the output record batch. Besides the function for processing batches, an operator might want to take different actions when the status of input data streams changes. For instance, for the aggregation operator, when the input stream becomes deprecated, it has to reset all the aggregated results, e.g., setting the accumulated sum as zero. To support this, the platform provides multiple trigger functions (e.g., on inputs being deprecated, on inputs being failed, on operator being stopped, etc.) such that operators can implement their own logic. In this sense, the engine is a push-based job engine. When an operator's input stream's status have been determined (i.e., not in the status of Blocking), it will check the status (and record batches if applicable) and apply the processing or trigger function accordingly. This routine is the basic scheduling unit in the system, and is it described in more detail below.

A UDF operator returns stateless-transformed results over the input batches, e.g., project, filter in databases. A UDA operator returns stateful-aggregated results over the input batches, e.g., aggregation in databases. For example, for a sequence of batches (A, B, C), a UDF outputs (func(A), func(B), func(C)), whereas a UDA outputs (func(A), func(A+B), func(A+B+C)), where A+B is the vertical concatenation of batch A and B. Whether an operator is a UDF or UDA has a direct impact on the version of its output data stream. For a UDF, the operator simply publishes a output batch to the current version of the output stream. Instead, a UDA has to deprecate the current version of its output stream and publish the output batch to the new version such that the downstream operators then take actions (e.g., resetting their states) accordingly. A UDA can be non-incremental or incremental, depending on whether they need to see all previous batches, for example, computing the sum is incremental, while training a ML model can be non-incremental. UDFs or UDAs implement the following interface whose functions are executed at different moments: Open, which is executed when being initialized; Reset, which is executed every time after the input streams have been initialized or deprecated; Close, which is executed when being finalized; and Process, which is executed every time when the inputs become ready for processing.

A job is a DAG of operators. It manages and coordinates the operators, for instance, by scheduling their execution (in the scheduler 1112, FIG. 11), and managing their memory usage (in the storage manager 1114). To execute a job (i.e., computing a next result), preferably a bottom-up approach to traverse the DAG is used. That is, for an operator, if its inputs are ready, then Process is run to produce outputs, which then go to its downstream operators (i.e., operators subscribing to it); otherwise, go to the upstream operators and repeat the procedure. By starting from the last operator, the critical path to compute the next result is followed.

Figure 13:
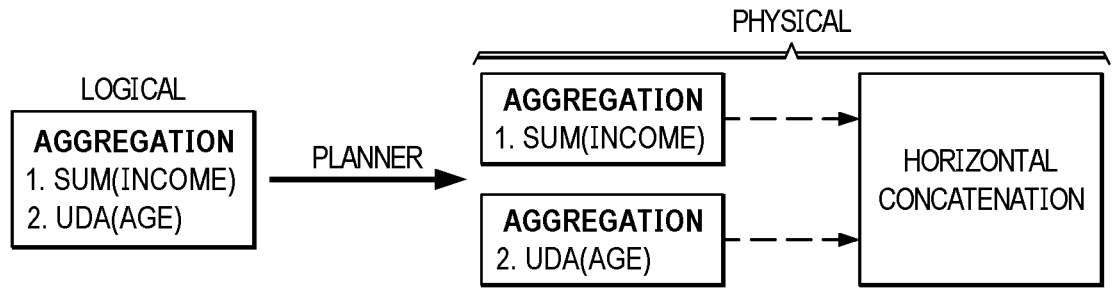
FIG. 13 depicts an example of the hybrid execution approach of this disclosure, wherein some operators are written as native C++ and others are running in Python runtime; and wherein such operators communicate indirectly through data streams.

FIG. 13 depicts the hybrid execution technique of this disclosure, wherein operators are not required to conform to a particular language or execution environment. Rather, the platform supports executing operators written in C++ or Python. In general, basic analytical operators (e.g., project, filter, aggregation) are implemented in C++ and machine learning or data mining operators are implemented in Python (e.g., random forest classifier). The decoupling of operators through data streams makes this possible, and Apache Arrow's zero-copy data access across languages makes the serialization/deserialization cost negligible. This hybrid scheme extends the functionality of the computation engine, as well as allowing for more fine-grained execution to promote both efficiency and flexibility. For example, for aggregation, predefined aggregation methods are implemented in C++ (e.g., sum, count, average or the like), and users also can provide their own custom aggregation method written in Python (as a UDA). This is done by leveraging job rewrite and planning as depicted in FIG. 13. In particular, and given the description of the aggregation (in this example), the planner extracts the predefined aggregation methods and creates a new native operator for them; likewise, any user-defined aggregation methods are extracted and a user-defined operator created. The system further adds a horizontal concatenation operator to merge the outputs of this pair of aggregation operators.

For certain data sources (e.g., Database Management Systems (DBMS)), a job plan is restructured to utilize the internal processing capabilities of the underlying data store. For example, in one example, sampling, predicate and join operations are pushed down to DBMS to leverage its efficient implementations of indexes and algorithms.

The following section describes how the system performs scheduling using the scheduler component. The above discussed the execution scheme for a single job. For a multi-tenant use case, jobs are scheduled across multiple users using an adaptive scheduling strategy as is now described.

Preferably, a scheduling task for an interactive data system such as disclosed herein should be small (in terms of workloads) to allow for fine-grained control and fast responses. On the other hand, if the tasks are too small, there will be too many tasks for a single job, incurring overhead in scheduling. As discussed above, typically a scheduling task is scoped as a routine function that pulls the input stream and applies a processing or trigger function. For example, for filter, the routine pulls the input stream and gets one record batch (if the status is HasNext), computes a filtered batch and publishes it to the output stream. If the input stream's status is not HasNext (e.g., Failed), this routine applies other trigger functions accordingly (e.g., OnFailed). The scheduling framework assigns pending operators to workers in a pool, which in turn execute the operator's routine function as a task.

According to another aspect of this disclosure, an adaptive scheduling strategy is implemented. This strategy is priority-based. Ideally, the priority of a job has a strong correlation with overall user experience, typically influenced by the following factors: (1) the first response time, in that a user would like to get the first response as quickly as possible; (2) the quality of responses over time, in that a user would like to see the quality of response improve as much as possible. Based on this notion, the scheduling strategy herein gives the highest priority to a new job (i.e., a job without any computed results yet) and prefers jobs with low quality.

Regarding priority, and given the variety of operator semantics, it is difficult to measure the quality of a job simply by examining its outputs without operator-specific logic. Instead, and in one example implementation, the square root of the average number of processed input rows is used as an approximation for the overall quality of a job, that is, $Q=\sqrt{R}$. This is based on the observation that the error of many operators (e.g., aggregation) is proportional to the inverse of the square root of the input size. Between each result of the job, there is a quality change $\Delta Q$ and an elapsed time $\Delta T$, and thus $\Delta Q/\Delta T$ approximates the relative quality improvement for scheduling this job. If the job has made good enough quality, however, it should be de-prioritized to favor early-stage jobs, therefore, the above value may be normalized by dividing Q.

It may be desirable to prioritize across job types, e.g., preferring analytical jobs over jobs that simply dump outputs to a file. As another example, assume a job in the back-end corresponds to a visualization in the front-end; if the visualization is moved out of the screen by the user, its corresponding job can be deprioritized. Generalizing, a weight W is defined to adjust the priority based on job type and visual status, e.g., a large weight for some jobs expected to have very high priority. In summary, in a preferred embodiment the priority of a job is defined by $\Delta Q \cdot W/\Delta T \cdot Q$.

By leveraging the adaptive scheduling strategy, the job with the highest priority is found. To extract a task from a job, the scheduler finds the most useful task towards computing the next result. To achieve this, and as described above, the scheduler traverses its DAG by a bottom-up approach (i.e., starting from the last operator, for example, the aggregation operator in FIG. 11), finding an idle bottleneck operator whose inputs are ready and whose Process can be run to produce outputs. By starting from the last operator, the most pressing task for the next result is found and acted upon. In one example implementation, the scheduler utilizes a global job queue. To improve concurrency, a copy-on-write queue is also used, that is, each worker gets an immutable snapshot. Furthermore, preferably the priority of a job changes only when there is a new result, therefore, preferably the priority is stored with the job; the worker computing the next result updates it, while other workers can just use the stored value to avoid redundant computation.

Figure 14:
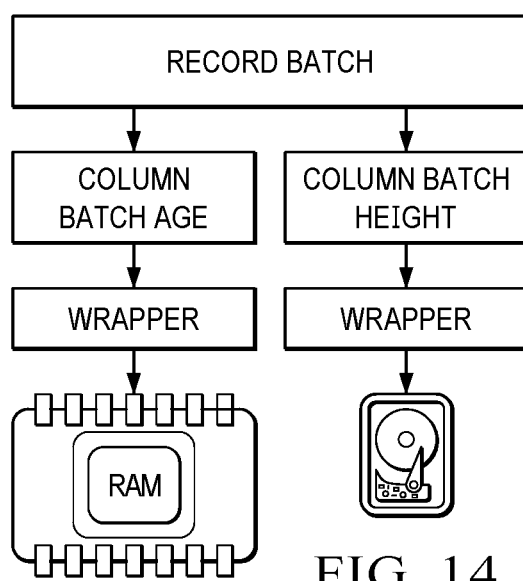
FIG. 14 depicts a preferred storage management technique of this disclosure.

The following section describes how data storage is implemented by the storage manager component. The approach is based on an Apache Arrow layout, which uses a memory pool to allocate the memory space and keep track of the memory usage. The system herein extends that layout to include an array wrapper layer, as depicted in FIG. 14. This approach adds another layer between the data (i.e., record batch and column batch) and the actual Arrow array data. This enables the system to use disk as a secondary storage. In particular, and as shown, a record batch has two columns; with the wrapper layer, one column is stored in memory and the other stored on disk. To dump an in-memory array onto the disk to free some memory space, the storage manager calls Serialize( ). Conversely, to read the data out, the storage manager uses data( ) to get the in-memory Arrow array, which reads the data from the disk, deserializes it (only if the array has been dumped before), and puts it back into memory. By implementing the wrapper layer, flexibility for data storage is achieved while keeping data access transparent to the column and record batch.

It is straightforward to estimate memory or disk usage for a column or record batch. The following section explains how to estimate the memory usage for a data stream and the estimation for disk usage.

Because the publish-subscribe pattern is used for data streams, publishers are used to estimate the memory usage. That is, for a publisher, if it is a persistent data stream (i.e., all the record batches are persistent in memory or on disk), memory usage is determined by summing up the total memory usage of all batches. Otherwise, because subscribers read data in the same order as they are published, and the underlying data are shared between subscribers, only the maximum memory usage among all subscribers (i.e., the memory usage of the slowest subscriber) needs to be considered. The memory usage of a subscriber is simply the sum of memory usages of all batches that are to be fetched.

The following describes how memory is managed in the system. Assume that a machine has a total memory capacity of X, and M % of it is reserved as the memory space for the engine. For example, M=90, although this is not a limitation. There are three major usages of memory by the system: (1) data sample (for storing the samples of loaded data sources (i.e., persistent data streams), for which S % of the total memory is allocated; (2) data stream (for storing all data streams for the communications between operators, for which D % of the total memory is allocated); and (3) runtime for the memory used by executing the operators (e.g., in-memory data structures, ML model, etc., for which R % is allocated). In one example implementation, S; D; R=30; 30; 30 (where S D R=M). The following describes additional details about how to estimate and control the memory usage for these purposes.

Regarding the data sample, because a data sample is merely a data stream plus some metadata information, the memory usage of a data sample is simply the sum. A preferred technique to control both memory and disk usage for samples is described below. Regarding the data stream, the stream manager manages all publishers and subscribers, therefore it is straightforward to compute the total memory usage of all data streams. Because operators produce data to the data streams, the memory usage of data streams preferably is limited by controlling the scheduling of operators. That is, if an operator's output stream has consumed too much memory (which means its subscribers are relatively slow consumers), it is not scheduled until its downstream operators have consumed the data. As an example, assume there is an operator reading a Parquet file (i.e., reader) and another operator doing reservoir sampling from the former's outputs (i.e., sampler). Reservoir sampling is slower, and it is possible that the reader produces too much data for the sampler to process. In this case, when the reader's output stream has more memory usage than the threshold the reader is not scheduled until the sampler has processed the data.

Regarding runtime, as noted above there are both C++ and Python operators running in the system simultaneously. To keep track of the memory usage of an operator, memory profiling does not always work efficiently, especially in C++. For native operators that are part of the system, a self-reporting mechanism is used. That is, an operator can override a method GetMemoryUsageInBytes to report its memory usage. For example, for a join operator, it can compute the memory usage of its index in the method. For external operators (i.e., user-defined ones) that, for example, are Python-based, Python's memory profiling mechanism is used to estimate the memory usage. If the total runtime memory usage is beyond the threshold, the job consuming the most memory is terminated.

The following describes how disk management is implemented in the system. The disk serves as the main storage for persisting data streams. Persistent data streams are used for two purposes: (1) Data sample (preferably, a data sample is always persistent on disk and deserialized into memory when being used, for which S % of the total disk space is allocated); (2) Intermediate result (i.e., caching the results of some operators because they are expensive to compute, e.g., join and Python scripts, for which C % of the total disk is allocated). In one example implementation, S; C=60; 40 is utilized. Similarly, the disk usage for a data sample is straightforward to compute.

Figures 15, 16:
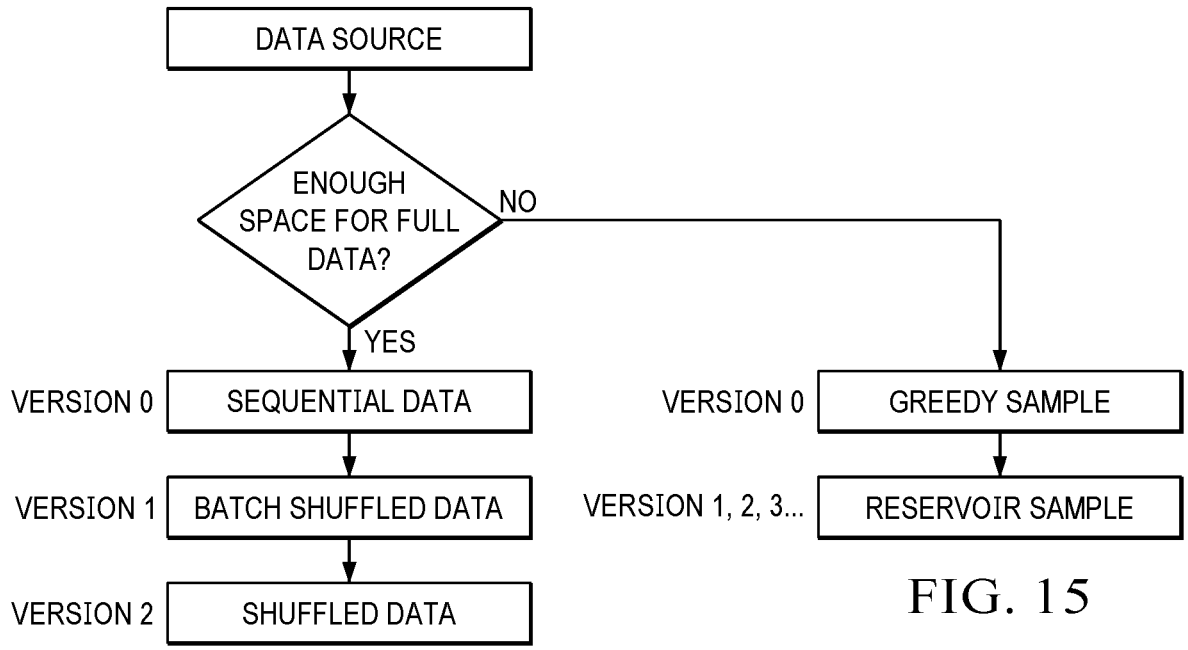
FIG. 15 depicts a representative sampling strategy that is implemented in this disclosure.
FIG. 16 depicts a sample space algorithm that is implemented by the data engine of this disclosure.

The following describes a preferred technique to manage the memory and disk usage as noted above, the We discuss how to manage the memory and disk usage for data samples. A preferred approach is depicted in FIG. 15. For a data source, if its size is known and it fully fits into an available sample space (FIG. 11, in the sample store), the full data is used to create the first version of the sample, preferably by reading sequentially. Next, batch-shuffled data (which only shuffles the order of batches and thus is much faster) is used as a next version. Finally, fully shuffled data is used as the final version. If, however, the size of the data source is unknown or it cannot fit fully, a down-sized sample is created. In particular, the process returns the first K rows as the first version, where K is decided by the sample space reserved. This is a greedy sample. The system maintains a reservoir sample simultaneously and publishes it as a newer version with a fixed interval, e.g., after reading every 10% of data, such that there are multiple versions for the reservoir samples and later versions have better quality because they are built over larger data. In practice, different methods are used to compute the progress, for example, for databases this is easily done by checking the row counts; for a file-based data source (e.g., CSV or Parquet), this is estimated by comparing the position of file pointer and the total file size.

A preferred sample space reservation algorithm is depicted in FIG. 16. It operates as follows. First, and given a data source, the sample space to be reserved is determined. Assume that the current free sample space is $S_{free}$ and that the size of the data source is $S_{data}$. If there is enough space for the full data source (i.e., $S_{data}$ $S_{free}$), the full data is stored. Otherwise, and given a threshold for a reasonable sample size $S_{min}$ (e.g., 1 GB) the lower value of these two is used as the minimum sample size s, which is the sample size to reserve. The algorithm aims to treat each sample fairly and make samples have comparable spaces. To this end, the notion of diminishing return is adopted, i.e., keep shrinking the largest sample down to the second largest sample while keeping the sample size beyond $S_{min}$, until there is enough free space or it is not possible to shrink any more. If enough space can still not be found, an out of capacity error is returned.

The algorithm is used to reserve disk space for samples. For the memory space and since a sample is always stored on a disk, preferably a Least Recently Used (LRU) strategy is used to evict samples.

The following describes a preferred caching mechanism. There are two aspects about caching, i.e., what to cache, and what to evict. For the latter aspect, preferably LRU is used. For the former one, an adaptive approach is used to provide hints. When a job is finished, preferably the whole DAG is checked to find the sub-graphs that fulfill one or more of cost, frequency and space constraints. The cost constraint is that this sub-graph must be costly (in terms of time) enough to compute; a minimum threshold (e.g., 5 seconds) may be used. The frequency constraint is that this sub-graph must be used frequently recently (e.g., used 5 or more times). A frequency table is maintained and reset periodically to keep its freshness. The space constraint is that the sub-graph must not take too much space, e.g., more than 10% of the total space for caching. After getting the hint, the system caches this sub-graph, and later jobs with the same sub-graph can reuse the cached intermediate results. Other caching approaches may be implemented.

The following describes other front-end aware optimizations that improve end user experience and usability of the system. One such optimization is a stopping mechanism. In particular, one important observation is that users usually do a lot of operations back and forth in a short period of time at the front-end, i.e., the trial-and-error process. The front-end sends a stop job request to the back-end when a job is no longer needed (e.g., the user changes the parameter or removes the operation). At the back-end, a fast stop mechanism is executed. In particular, there is a signal variable for each job, and the operators periodically check it while executing and stop the execution as soon as possible when the stop signal is up. Preferably, a being-stopped job is afforded the highest priority in scheduling, such that it can finish up the stopping (e.g., some clean ups) as soon as possible. This fast stopping mechanism saves resources by not executing unnecessary jobs.

Another optimization is a skip response mechanism. In particular, and considering the responses sent from the back-end typically are visualized in some way at the front-end and then perceived by the users, the system safely skips some responses when there are too many of them generated in a short period of time, because the users would not notice it. For example, and when there is a response to send, if the previous response was sent 100 milliseconds ago (as an example), the system waits for another 100 milliseconds (as another example) to see if there are newer responses produced. If there are, only the newest response is sent and the one or more responses in between are skipped. This skip response mechanism conserves network bandwidth and also reduce the pressures of visualization at the front-end.

Still another optimization provides front-end feedback to the back-end. To better improve the overall user satisfaction, the front-end sends some feedback to the back-end to help it make better decisions in many aspects through user interactions. For example, the front-end provides the back-end a hint for scheduling priority in the following scenario. When a user drags an ongoing operation out of the screen, the front-end can then let the back-end know it should decrease its priority in scheduling to favor other on-screen jobs. This example is not intended to be limiting.

Preferably, users of the system are able to implement their own UDF/UDA operators through the front-end. These are sometimes referred to herein as external operations. For security purposes, preferably a secure sandbox mechanism is implemented (e.g., by using Docker and Arrow Flight) to ensure that an external operator does not consume too many resources. When the back-end initializes an external operation, the system creates a Docker container running the Flight server, and when the operator is scheduled to run a function (e.g., Open, Process), an action is sent from the main scheduler process to the container through RPC, the container executes the action and sends the results back to the main process. Ab operator in the main process monitors the container statistics and kills the container when it overuses the predefined resources.

Besides support for the external UDF/UDA operators, users can write one-line expressions to create new columns or filter rows in Python syntax. For example, they can easily calculate Body Mass Index (BMI) with weight/(height*height) or get the first name of a customer with FullName.split(' ')[0]. The hybrid execution scheme described above is used to achieve the trade-off between flexibility and efficiency, that is, during the job rewrite phase, if an expression can be efficiently executed in C++, a C++ operator is created for it; otherwise, its Python counterpart is used. For C++, the system implements a parser for the C++-compatible expression (which is a subset of Python). The parser creates LLVM expressions using Gandiva, a LLVM-based expression compiler for Apache Arrow.

In summary, the back-end system as described above combines multiple aspects, including progressive computation, approximate query processing and sampling. Moreover, and considering the complexity of prescriptive analytics, the system provides extensive support for user-defined operations, and it implements a latency-aware framework to optimize multi-tenant scenarios.

What we claim is as follows:

1. A method for performing analytics on a dataset comprising a plurality of data sources, comprising:
    providing a visual workspace displaying, concurrently, one or multiple sets of data configured as dataframes, together with a set of one or more operators that process data, wherein each dataframe is a structured or semi-structured piece of data generated from a datasource or an operator, and wherein an operator is a block of computation; and
    supporting a processing engine as an accelerator between the visual workspace and the plurality of data sources, wherein in response to a change to one of: a dataframe, and an operator, the processing engine automatically updates a state of the visual workspace using a computation over data stored in one or more of the plurality of data sources, wherein the computation returns a progressive stream of responses that includes a first response that is an approximation, one or more incremental updates, and an optional final response, wherein a response is a data stream, and wherein the first response is returned based on an initial subset or sample of the dataset;
    wherein, as the computation iterates by scaling over the dataset, results are progressively refined and returned as the one or more incremental updates and the final response.

2. The method as described in claim 1 wherein a data stream comprises one or more versions of increasing size.

3. The method as described in claim 2 wherein a version of the data stream is a sequence of one or more record batches, wherein a record batch is a set of equal-length column batches, wherein a column batch is an array of consecutive values for a single column.

4. The method as described in claim 3 wherein the initial portion of the dataset is a first record batch.

5. The method as described in claim 3 further including:
    determining whether a data source fits within an available data sample space; and
    when the data source fits within the available data sample space, creating a first version corresponding to the first response by reading from the data source sequentially, creating a next version corresponding to an incremental update using batch-shuffled data from the data source, and creating a final version corresponding to the final response using fully-shuffled data from the data source.

6. The method as described in claim 5 wherein when the data source does not fit within the available data sample space or its size is unknown, creating the first version to fit within a reserved data sample space and allocating another portion of the data sample space as a reservoir sample;
    wherein at least the next version corresponding to the incremental update is then published from the reservoir sample.

7. The method as described in claim 6 further including executing a data sample space reservation algorithm that shrinks one or more data samples to provide fair allocation of data samples derived from the data source.

8. The method as described in claim 1 wherein the analytics are one of: descriptive analytics, predictive analytics, and prescriptive analytics.

9. The method as described in claim 1 wherein the set of operators comprise a machine learning (ML) model building operator.

10. The method as described in claim 1 wherein the block of computation associated with an operator generates one of: a visual representation, a dataframe, a filter output, and a new operator.

11. The method as described in claim 1 further including re-executing a given operator upon change associated with one or more dataframes associated with the given operator.

12. The method as described in claim 1 further including providing an operator of the set of operators as one of: an insight on a dashboard, an image file download, and an embeddable object.

13. The method as described in claim 1 wherein an operator of the set of operators is user-defined with code.

14. The method as described in claim 1 wherein multiple end users collaborate with one another using the visual workspace.

15. The method as described in claim 14 wherein multiple end users collaborate using video conference windows within an infinite canvas.

16. The method as described in claim 1 wherein during the data stream-based computation at least one operator publishes a data stream, and at least one other operator subscribes to the published data stream.

17. The method as described in claim 1 wherein the data stream-based computation is configured as a job, wherein the job is represented as a directed acyclic graph (DAG) of operators.

18. The method as described in claim 17 wherein the directed acyclic graph is traversed in a bottom-up manner during the computation.

19. The method as described in claim 1 further including interrupting the computation when it is determined that an incremental update or the final response is no longer necessary.

20. The method as described in claim 1 further including skipping over at least one response.

21. The method as described in claim 1 wherein the visual workspace also supports a set of links, and wherein a first type of link defines how data flows between operators, and a second type of link applies a filter predicate to a dataframe.

22. A software-as-a-service computing platform comprising;
- network-accessible computing hardware;
- software executing on the computing hardware, the software comprising program code for performing analytics on a dataset comprising a plurality of data sources, the program code comprising:
  - program code that provides a visual workspace displaying, concurrently, one or multiple sets of data configured as dataframes, together with a set of one or more operators that process data, wherein each dataframe is a structured or semi-structured piece of data generated from a data source or an operator, and wherein an operator is a block of computation; and
  - program code comprising a processing engine positioned between the visual workspace and the plurality of data sources, wherein in response to a change to one of: a dataframe, and an operator, the processing engine automatically updates a state of the visual workspace using a computation over data stored in one or more of the plurality of data sources, wherein the computation returns a progressive stream of responses that includes a first response that is an approximation, one or more incremental updates, and an optional final response, wherein a response is a data stream, and wherein the first response is returned based on an initial subset or sample of the dataset;
- wherein, as the computation iterates by scaling over the dataset, results are progressively refined and returned as the one or more incremental updates and the final response.

* * * * *